US009211880B2

(12) United States Patent
Mair

(10) Patent No.: US 9,211,880 B2
(45) Date of Patent: Dec. 15, 2015

(54) METHOD FOR ADAPTING A CHARACTERISTIC CURVE OF CLUTCHES IN A PARTIAL DOUBLE-CLUTCH TRANSMISSION OF A MOTOR VEHICLE

(75) Inventor: Roland Mair, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 23 days.

(21) Appl. No.: 13/825,668

(22) PCT Filed: Aug. 3, 2011

(86) PCT No.: PCT/EP2011/063344
§ 371 (c)(1),
(2), (4) Date: Mar. 22, 2013

(87) PCT Pub. No.: WO2012/038136
PCT Pub. Date: Mar. 29, 2012

(65) Prior Publication Data
US 2013/0190134 A1 Jul. 25, 2013

(30) Foreign Application Priority Data
Sep. 24, 2010 (DE) .......................... 10 2010 041 303

(51) Int. Cl.
*G06F 7/00* (2006.01)
*B60W 10/00* (2006.01)
(Continued)

(52) U.S. Cl.
CPC .............. *B60W 10/02* (2013.01); *B60W 10/06* (2013.01); *F16H 61/688* (2013.01);
(Continued)

(58) Field of Classification Search
CPC ..... B60W 10/00; B60W 10/02; B60W 10/06; F16H 61/688; F16H 2342/00; F16H 2059/6823; F16H 2061/64; F16H 2061/87; F16H 2061/96; F16H 2342/04; F16H 2061/0087; F16H 2061/0096; F16H 2061/064; F16D 2500/00; F16D 2500/1086; F16D 2500/1083; F16D 2500/30808; F16D 2500/50245; Y10T 477/6425; Y02T 477/6425
USPC ................................................ 701/68; 477/86
See application file for complete search history.

(56) References Cited

U.S. PATENT DOCUMENTS 4,966,048 A    10/1990 Braun
5,679,091 A *  10/1997 Salecker et al. ............... 477/86
(Continued)

FOREIGN PATENT DOCUMENTS

DE         103 08 517 A1    9/2004
DE    10 2004 039 273 A1    2/2006
(Continued)

OTHER PUBLICATIONS

German Search Report Corresponding to DE 10 2010 041 322.4.
(Continued)

*Primary Examiner* — Calvin Cheung
*Assistant Examiner* — Angelina Shudy
(74) *Attorney, Agent, or Firm* — Davis & Bujold, P.L.L.C.; Michael J. Bujold

(57) ABSTRACT

A method of adapting the characteristic curve of clutches in a partial dual-clutch transmission of a vehicle, for example a utility vehicle, having a first partial transmission in the form of a dual-clutch transmission (DKG) having a dual clutch (DK) that includes a first clutch (K1) and a second clutch (K2), which can be functionally connected to a drive engine (M), and a second partial transmission in the form of a main transmission (HG) which shifts with traction force interruption and which is arranged downstream from the dual-clutch transmission (DKG) in a drive-train. To achieve reliable and precise clutch control and a consistently high level of shifting comfort, the characteristic curve adaptation of the first and the second clutches (K1, K2) is carried out with the assistance of a pre-loading of the first and the second clutches (K1, K2), while the main transmission (HG) is in a neutral position.

12 Claims, 2 Drawing Sheets

(51) Int. Cl.
  *B60W 10/02* (2006.01)
  *F16H 61/688* (2006.01)
  *B60W 10/06* (2006.01)
  *F16H 59/68* (2006.01)
  *F16H 61/00* (2006.01)
  *F16H 61/06* (2006.01)

(52) U.S. Cl.
  CPC ............... *F16D 2500/1083* (2013.01); *F16D 2500/1086* (2013.01); *F16D 2500/30808* (2013.01); *F16D 2500/50245* (2013.01); *F16H 2059/6823* (2013.01); *F16H 2061/0087* (2013.01); *F16H 2061/0096* (2013.01); *F16H 2061/064* (2013.01); *F16H 2342/00* (2013.01); *F16H 2342/04* (2013.01); *Y10T 477/6425* (2015.01)

(56) References Cited

U.S. PATENT DOCUMENTS

| | | | | |
|---|---|---|---|---|
| 5,839,084 | A  * | 11/1998 | Takasaki et al. | 701/67 |
| 6,953,417 | B2 * | 10/2005 | Koenig | 477/181 |
| 6,966,868 | B2 * | 11/2005 | Stork et al. | 477/74 |
| 7,131,932 | B2 * | 11/2006 | Fahland et al. | 477/174 |
| 8,052,579 | B2 * | 11/2011 | Eich et al. | 477/175 |
| 8,271,171 | B2 * | 9/2012 | Terwart et al. | 701/68 |
| 8,725,372 | B2 * | 5/2014 | Rinck et al. | 701/67 |
| 2007/0017309 | A1 * | 1/2007 | Hasegawa et al. | 74/331 |
| 2008/0134834 | A1 * | 6/2008 | Gitt et al. | 74/745 |
| 2009/0095101 | A1 * | 4/2009 | Gitt | 74/331 |
| 2009/0120710 | A1 * | 5/2009 | Hasegawa et al. | 180/365 |
| 2009/0325763 | A1 * | 12/2009 | Dittrich et al. | 477/109 |
| 2010/0006365 | A1 * | 1/2010 | Hasegawa et al. | 180/338 |
| 2010/0114443 | A1 * | 5/2010 | Terwart et al. | 701/68 |
| 2010/0185370 | A1 * | 7/2010 | Wurthner et al. | 701/61 |
| 2011/0030488 | A1 | 2/2011 | Gumpoltsberger et al. | |
| 2011/0036186 | A1 * | 2/2011 | Gumpoltsberger et al. | 74/331 |
| 2013/0023375 | A1 * | 1/2013 | Renner | 475/209 |
| 2013/0184946 | A1 * | 7/2013 | Bradley et al. | 701/51 |
| 2013/0197769 | A1 * | 8/2013 | Schneider et al. | 701/68 |
| 2013/0203555 | A1 * | 8/2013 | Schneider et al. | 477/83 |
| 2014/0150584 | A1 * | 6/2014 | Terashima | 74/330 |
| 2014/0171263 | A1 * | 6/2014 | Steinborn et al. | 477/79 |
| 2014/0305239 | A1 * | 10/2014 | Lubke et al. | 74/331 |

FOREIGN PATENT DOCUMENTS

| | | |
|---|---|---|
| DE | 10 2005 033 027 A1 | 1/2007 |
| DE | 10 2006 054 281 A1 | 6/2008 |
| DE | 10 2007 048 268 A1 | 4/2009 |
| DE | 10 2009 004 709 A1 | 7/2009 |
| DE | 10 2008 008 496 A1 | 8/2009 |
| DE | 10 2008 001 200 A1 | 10/2009 |
| DE | 10 2008 043 384 A1 | 5/2010 |
| EP | 1 624 232 A1 | 2/2006 |
| EP | 2480439 A1 * | 8/2012 |
| WO | 2004/076225 A1 | 9/2004 |
| WO | 2009/047162 A1 | 4/2009 |
| WO | WO 2009056435 A1 * | 5/2009 |
| WO | 2009/127473 A1 | 10/2009 |

OTHER PUBLICATIONS

German Search Report Corresponding to DE 10 2010 041 303.8.
International Search Report Corresponding to PCT/EP2011/063345.
International Search Report Corresponding to PCT/EP2011/063344.
Written Opinion Corresponding to PCT/EP2011/063345.
Written Opinion Corresponding to PCT/EP2011/063344.

* cited by examiner

METHOD FOR ADAPTING A CHARACTERISTIC CURVE OF CLUTCHES IN A PARTIAL DOUBLE-CLUTCH TRANSMISSION OF A MOTOR VEHICLE

This application is a National Stage completion of PCT/EP2011/063344 filed Aug. 3, 2011, which claims priority from German patent application serial no. 10 2010 041 303.8 filed Sep. 24, 2010.

FIELD OF THE INVENTION

The invention concerns a method for adapting the characteristic curve of clutches in a partial dual-clutch transmission.

BACKGROUND OF THE INVENTION

For reasons of comfort and performance, automated transmissions capable of power-shifting are increasingly used in utility vehicles. In this regard dual-clutch transmissions which shift without traction force interruption are particularly attractive. Transmission structures of dual-clutch transmissions for utility vehicles are known, for example, from DE 10 2005 033 027 A1 and DE 10 2006 054 281 A1. Such automated variable-speed transmissions comprise an intermediate transmission or a plurality of intermediate transmission groups arranged drive-technologically one after another, and if necessary a planetary transmission arranged drive-technologically downstream therefrom.

In a classical dual-clutch transmission, the gears are as a rule divided between two transmission branches in a direct and an indirect gear group, such that each group is associated with one clutch of the dual clutch. By means of the dual clutch a sequential shift sequence virtually without traction force interruption can be carried out, such that in each case the next gear is pre-selected in the currently load-free transmission branch and the gearshift takes place by overlapped actuation of the two clutches. The force flow of the gears can run in a conventional manner by way of a drive input shaft and a drive output shaft, or it can meander through the transmission by way of shafts that change a number of times.

Compared with pure power-shifting automatic transmissions of planetary design, automated variable-speed transmissions have efficiency and cost advantages. However, as the number of gears increases, so too do the structural size, the structural complexity and therefore the production cost. Since, depending on their field of use, utility vehicle transmissions require a relatively large number of gears in order to produce a defined transmission spread and to operate efficiently, particularly for use in utility vehicles it is expedient also to consider less expensive and more compactly designed, mixed transmission forms, namely so-termed partial dual-clutch transmissions. In such partial dual-clutch transmissions, besides a power-shifting transmission or transmission section with a dual clutch, a conventional transmission section that shifts with traction force interruption, for example a main transmission group or a downstream transmission that shifts with traction force interruption, for example a transfer box or an axle transmission, is also provided. With such partial dual-clutch transmissions, therefore, traction force interruptions have to be accepted in the case of some gearshifts.

For example, DE 10 2008 008 496 A1 shows a variable-speed transmission whose mode of action corresponds to that of a partial dual-clutch transmission. The variable-speed transmission has a first and a second input shaft which, in each case by way of one clutch of a dual clutch, can be connected to a drive engine. In addition there is a countershaft to which the two input shafts are coupled by a first and a second input gearset with different gear ratios. A drive output shaft can be coupled selectively to the countershaft by way of various further gearsets. A two-directional gearshift between a first gear and a second gear can be carried out without traction force interruption and without further shift processes by overlapped opening or closing of the two clutches, since the force flow in these gears only changes between the first and second input gearsets, but extends via the further gearset to the drive output shaft. The other gearshifts require shifting of the gear clutches involved, which results in a traction force interruption. To reduce the disadvantages of such traction force interruptions is the objective of another invention by the present applicant.

Another problem with partial dual-clutch transmissions and other automated transmissions having a dual clutch, is adapting the characteristic curve of the clutches, which are as a rule designed as friction elements. In this context the relationship between a clutch position or a regulating path point of a clutch and the coupling torque it can transmit is, as is known, an essential parameter, which is stored in the form of characteristic curves or performance graphs in a control computer and made available for the purposes of a transmission control process.

For example, if the clutch is open too far, starting processes can be delayed and the vehicle may even roll backward. On the other hand, if the clutch is closed too far, crawling may take place too actively and with unforeseen movement of the vehicle. During driving operation, if the characteristic clutch points (traction point, entrainment point, contact point, etc.) are not known accurately, shift processes may be accompanied by torque impulses and/or increased wear. The path and torque characteristics of a clutch can change due to temperature, rotational speed, wear and aging effects. Accordingly, for consistent, proper and comfortable control and operation of the dual clutch and the transmission, the relationship between the clutch position and its coupling torque must be updated regularly in a characteristic curve or table.

In accordance with known methods this relationship is determined by a teach-in process which essentially makes use of the parity between the engine torque and the clutch torque during slipping phases of the clutch. The adaptation can always take place when the clutch concerned is closed under load with slip. Basically, this is possible during starting processes or after gearshifts. Since in the case of dual-clutch transmissions the clutches are used in an overlapping manner during gearshifts, so that clear determination of the clutch torque is not possible, slipping phases of the clutch after gearshifts are useless for characteristic curve adaptation. Thus, fewer adaptation opportunities are available, in particular only the starting processes. Moreover, in starting processes in most cases the same gear and its associated clutch are used, so for the other clutch even regular starting processes are largely unavailable as adaptation opportunities. All in all therefore, this creates the problem that the association between clutch position and clutch torque cannot be determined for both of the clutches of a dual clutch with sufficient frequency and quality.

SUMMARY OF THE INVENTION

Against this background the purpose of the present invention is to indicate a method for adapting the characteristic curve of clutches in a partial dual-clutch transmission of a vehicle, which enables reliable and accurate clutch control along with a consistently high level of shifting comfort.

The invention is based on the recognition that in vehicles having a partial dual-clutch transmission with a power-shifting dual-clutch transmission section and, downstream therefrom, a conventional main transmission section that shifts with traction force interruption, operating phases during which the main transmission is shifted to neutral and therefore the drive engine and dual-clutch transmission in the drive-train are decoupled from the driven vehicle wheels can be used, in each case to carry out a characteristic curve adaptation for one of the two clutches or, in succession, for both clutches. This should be done by pre-loading the two clutches, so that in each case one clutch is operating with slip and the other clutch preferably in an engaged condition, such that a load torque on the drive engine is produced and thereby a teach-in process for the relevant clutch path point can be carried out at the slipping clutch.

Accordingly, the invention starts from a method for adapting characteristic curves of clutches in a partial dual-clutch transmission of a vehicle, for example a utility vehicle, which has a first transmission section designed as a dual-clutch transmission comprising a dual clutch with a first clutch and a second clutch that can be functionally connected to a drive engine, and with a second transmission section forming a main transmission which shifts with traction force interruption and which is connected in a drive-train drive-technologically downstream from the dual-clutch transmission. To achieve the stated objective the invention provides that adapting the characteristic curves of the clutches is carried out with the help of a pre-loading of the two clutches, during which the main transmission is in a neutral position.

The method can be used advantageously both with arrangements comprising a dual-clutch transmission section on the engine side and, downstream therefrom, a conventional transmission section, i.e. one which shifts with traction force interruption, and also with arrangements comprising a complete dual-clutch transmission and a downstream conventional transmission, for example a shiftable transfer box or axle transmission. The term partial dual-clutch transmission is understood to cover both of these arrangement variants.

Each clutch of the dual-clutch transmission or dual-clutch transmission section is associated with a respective one-gear or multi-gear dual-clutch transmission branch. In what follows, dual-clutch transmission is understood to mean both a complete transmission and a transmission section. A main transmission is understood to be a transmission or transmission section which, in the force flow, comes after the dual-clutch transmission or dual-clutch transmission section and whose design corresponds to that of a classical variable-speed transmission, which can be made as unsynchronized with claw shifting elements, or with synchronizing shifting packets.

By means of the method according to the invention the disadvantages of inaccurate control of a dual clutch owing to inadequacy of the teach-in phases are avoided, so that particularly for utility vehicles a transmission can be designed as a comparatively inexpensive and compactly built partial dual-clutch transmission, which to a large extent provides the same functionality and comfort as a power-shifting dual-clutch transmission, but which enables better clutch control.

The characteristic curve adaptation can be carried out advantageously in that in each case one of the two clutches is operated in an engaged condition, while the other clutch is actuated in the closing direction. By pre-loading the dual clutch in this way a load torque is produced, which is necessary for adjusting the clutch. However, this has no repercussions for the vehicle since the force flow to the drive output is interrupted by the neutral shift in the main transmission. Thus, the characteristic curve adaptation has no adverse effect on comfort.

With a partial dual-clutch transmission, driving situations in which the main transmission is shifted to neutral and a characteristic curve adaptation can be carried out occur comparatively frequently, for example always shortly after turning on the ignition and starting the drive engine, or each time the driver shifts into neutral when the engine is running, or whenever the transmission autonomously shifts to neutral, for example when the vehicle is at rest or during coasting. The characteristic curve adaptation can be carried out at every adaptation opportunity, but also after certain predetermined cycles.

The characteristic curve adaptation can advantageously be carried out in a number of steps, any intermediate condition being stored in a volatile or permanent electronic memory. For example, if during an adaptation cycle the driver makes a clutch-relevant demand that influences the engine and/or the transmission, the adaptation can be terminated or interrupted and clutch control can be transferred the driver. The termination point of the characteristic curve adaptation, i.e. the part thereof which has already been updated, is then stored so that at the next opportunity the adaptation can be continued from that point. The complete characteristic curves of both clutches are then obtained from two or more such adaptation phases.

Furthermore it can be provided that, if necessary with the help of a diagnosis instrument or a diagnosis device, the need for an adaptation can be checked and, in case of need, shortly afterward during the next suitable neutral shift of the main transmission a complete characteristic curve adaptation can be carried out. Accordingly, apart from the regular adaptation opportunities, selective characteristic curve adaptations can take place during suitable neutral shifts during the vehicle's operation, in that by means of a diagnosis device, in particular a vehicle-external diagnosis instrument, for example as part of a servicing break, the characteristic curve adaptation of the dual clutch can be called for.

This can in particular be the case if it is recognized that no adaptation data are present in the memory (data table in the EPROM of an associated vehicle control unit), since no previous adaptation has yet been carried out successfully or because the last adaptation cycle was a long time ago (time marking in the EPROM), or because an error monitoring system, for example by comparing the actual engine torque and the characteristic curve torque during a starting process, has detected an inaccurate clutch position (error entry in the EPROM). Basically, vehicle-internal diagnosis by virtue of which a need for adaptation is recognized and a characteristic curve adaptation initiated, are also possible.

The actual teach-in process for each clutch can then take place in accordance with a procedure known per se. However, the method according to the invention extends this procedure in the following respects:

a) the clutch to be adapted in each case is selected in advance, b) a torque variation or position variation of the dual clutch is specified, c) during the teach-in the clutch torque of the slipping clutch is calculated taking into account the interaction of the two clutches due to the pre-loading, and d) if necessary a suitable gear combination for the characteristic curve adaptation is pre-selected in the dual-clutch transmission.

Accordingly, in a characteristic curve adaptation, first the clutch currently available for adaptation or preferably the first one for which the teach-in process is to be applied is determined. Of the two clutches, the one that is not to be adapted is positioned so that during the teach-in process for the characteristic curve of the other clutch it is permanently engaged. For this, the clutch can be closed completely, or partially closed far enough to ensure that it cannot be brought to a slipping condition due to interaction with the clutch being adapted, or if necessary, it can be moved continuously in the closing direction. Then, to determine the position-torque relationship the clutch to be adapted is actuated in the closing direction. The clutch torque can be calculated from the available or determined engine torque value and the gear ratios of the dual-clutch transmission branches.

If a plurality of gears are available in one of the two dual-clutch transmission branches, a gear can be pre-selected which, by virtue of the gear ratio and the rotational speed situation at the engine, enables a particularly rapid, low-load and/or efficient characteristic curve adaptation for the clutch concerned. In relation to the clutch load, the adaptation time, the accuracy achievable and the torque range to be covered, it is advantageous to carry out the characteristic curve adaptation in sections.

In particular the friction energy input into the clutch can be reduced, where possible, by pre-selecting different gears in the dual-clutch transmission for different torque ranges so that the speed differences at the clutch are as small as possible. Thus it is also advantageous, in any respective torque range or characteristic curve section, always to adapt both clutches so as to make do with as few adaptation-related gearshifts as possible in the dual-clutch transmission.

In the characteristic curve adaptation, the manner in which the closing process of the clutch is carried out is particularly important. For this it can be provided that for the characteristic curve adaptation the speed/or acceleration of the clutch closing process is specified as a function of relevant characteristic curve sections, characteristic curve support points, clutch loads, adaptation times and/or the adaptation precision required. In particular it can be provided that the clutch closing process during characteristic curve adaptation is carried out continuously, in steps, gradually, or in accordance with some other specified form of variation, as desired.

Thus, the particular design of the closing process depends on a respective set objective. For example, if only a section of the characteristic curve is to be adapted, then it is advantageous to approach the beginning of this adjustment path section as quickly as possible and drive through it with the speed increasing in steps or gradually. In this, the engagement speed should be chosen at least fast enough to ensure that the clutch is not heated by the adaptation process itself to such a point that its friction coefficient changes, whereby the adaptation result could be falsified. Correspondingly, a smaller adaptation section can be traversed more slowly and thus more precisely than a larger section or the entire characteristic curve. Basically the relationship between the torque transmitted and the clutch position can be observed the better, the lower is the positioning speed, since an almost stationary torque determination is then obtained for small position intervals.

Since a clutch characteristic curve is usually stored in a control unit with discrete support points, it is particularly advantageous if the complete characteristic curve is not determined slowly and continuously, but rather, the support points are approached selectively and quickly and the position is held at those points for a defined time. The support points can be defined by particular clutch positions, such as the traction point, entrainment point, contact point, etc. or by corresponding clutch torques. As a result, in this way comparatively little friction energy is generated in the clutch and the adaptation time is shortened overall and at the same time, due to the temporary constancy of torque and position during the pause phases the adaptation result is improved, i.e. greater precision of the characteristic curve is achieved.

The adaptation result can be improved still more and adjustment can be simplified if a predetermined speed of the drive engine is kept constant during the characteristic curve adaptation. This ensures that no additional dynamic effects which have to be taken into account occur. Expediently, before the beginning of the adaptation, the engine speed is chosen such that the drive engine can certainly provide a load torque produced by the pre-loading of the dual clutch.

BRIEF DESCRIPTION OF THE DRAWINGS

To clarify the invention the description of drawings illustrating example embodiments are attached. The drawings show.

DETAILED DESCRIPTION OF THE PREFERRED EMBODIMENTS

Figure 1:
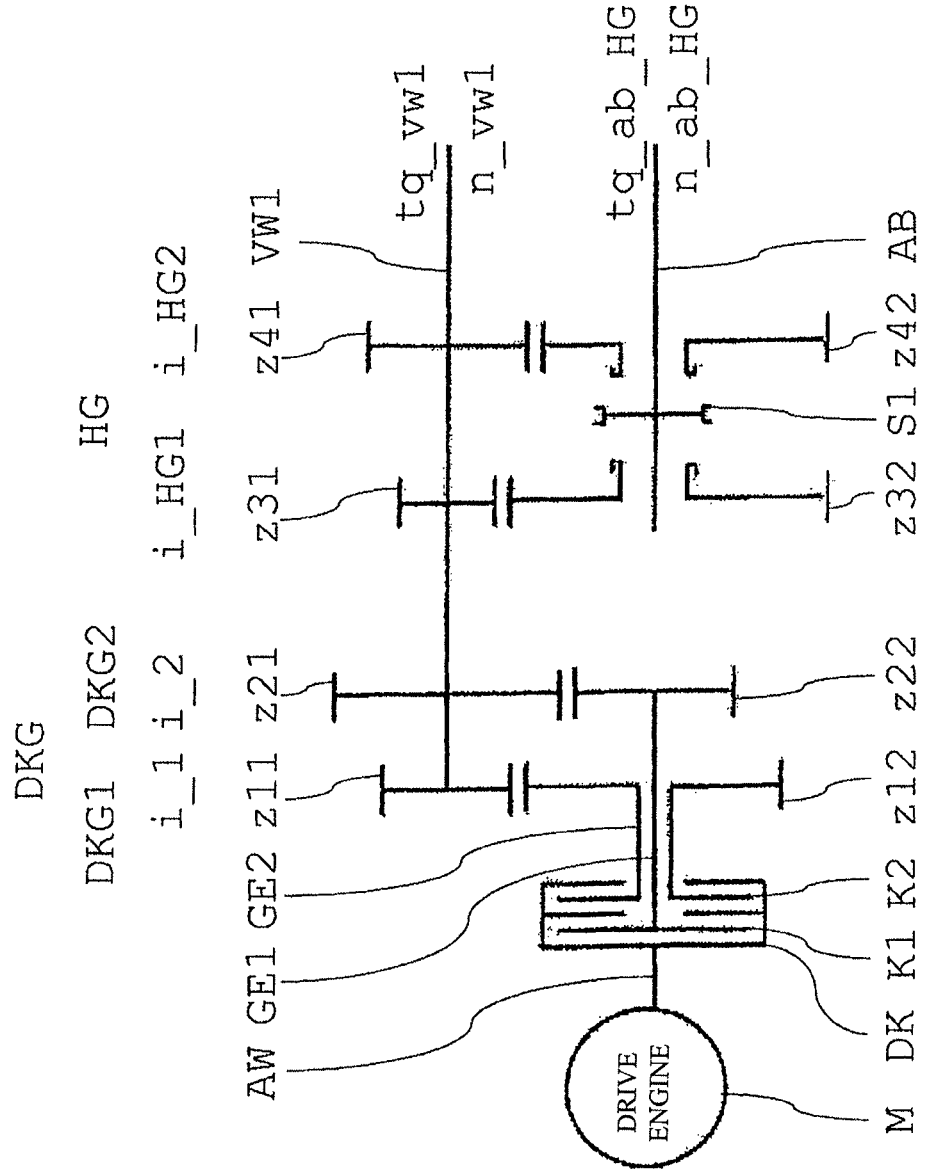
FIG. 1: A schematic representation of a partial dual-clutch transmission for carrying out a method according to the invention.

Accordingly, the partial dual-clutch transmission shown in FIG. 1, which is of countershaft design, comprises a first partial transmission in the form of a power-shiftable dual-clutch transmission DKG and a second partial transmission in the form of a main transmission HG which shifts with traction force interruption. The dual-clutch transmission DKG comprises a dual clutch DK with a first clutch K1 and a second clutch K2. The clutch input side is formed by a common clutch cage, which is connected to a driveshaft AW of a drive engine M in the form of an internal combustion engine.

A first transmission input shaft GE1 is connected fixed at its engine-side end to the first clutch K1 and at its transmission-side end to a gearwheel z22. The gearwheel z22 meshes with a gearwheel z21 arranged in a rotationally fixed manner on a countershaft VW1. The gearwheel pair z21/z22 forms a second input constant i_2, which together with the first clutch K1 forms a one-stage, second dual-clutch transmission branch DKG2.

A second transmission input shaft GE2 made as a shorter, hollow shaft is fitted over the first transmission input shaft GE1. At its engine-side end it is connected fixed to the second clutch K2 and at its transmission-side end to a gearwheel z12. The gearwheel z12 meshes with a gearwheel z11 arranged rotationally fixed on the countershaft VW1. The gearwheel pair z11/z12 forms a first input constant i_1 located upstream from the second input constant i_2, which forms a one-stage, first dual-clutch transmission branch DKG1. In its mode of action the dual-clutch transmission DKG corresponds to a splitter group for a downstream transmission group.

Connected drive-technologically downstream from the dual-clutch transmission DKG is a two-stage main transmission HG with a first main transmission gear i_HG1 and a second main transmission gear i_HG2. The first main transmission gear i_HG1 comprises a gearwheel z31 arranged in a rotationally fixed manner on the countershaft VW1, which meshes with a gearwheel z32 arranged and able to rotate on a drive output shaft AB. The two loose wheels z32, z42 can be alternately connected rotationally fixed to the output shaft AB by means of an unsynchronized shifting element S1 in the form of a claw clutch. To the countershaft VW1 is applied a drive torque tq_vw1 with a drive rotational speed n_vw1. At the output of the main transmission and thus of the transmission as a whole there is a resultant drive output torque tq_ab_HG with an output speed n_ab_HG, which acts upon the driven vehicle wheels or axles.

The partial dual-clutch transmission shown serves only as a simplified transmission structure for illustrating the method according to the invention. A real utility vehicle partial dual-clutch transmission can for example comprise two two-gear dual-clutch transmission branches and a three-gear or four-gear main transmission, so that twelve or sixteen forward gears and at least one reverse gear can be obtained.

Figure 2:
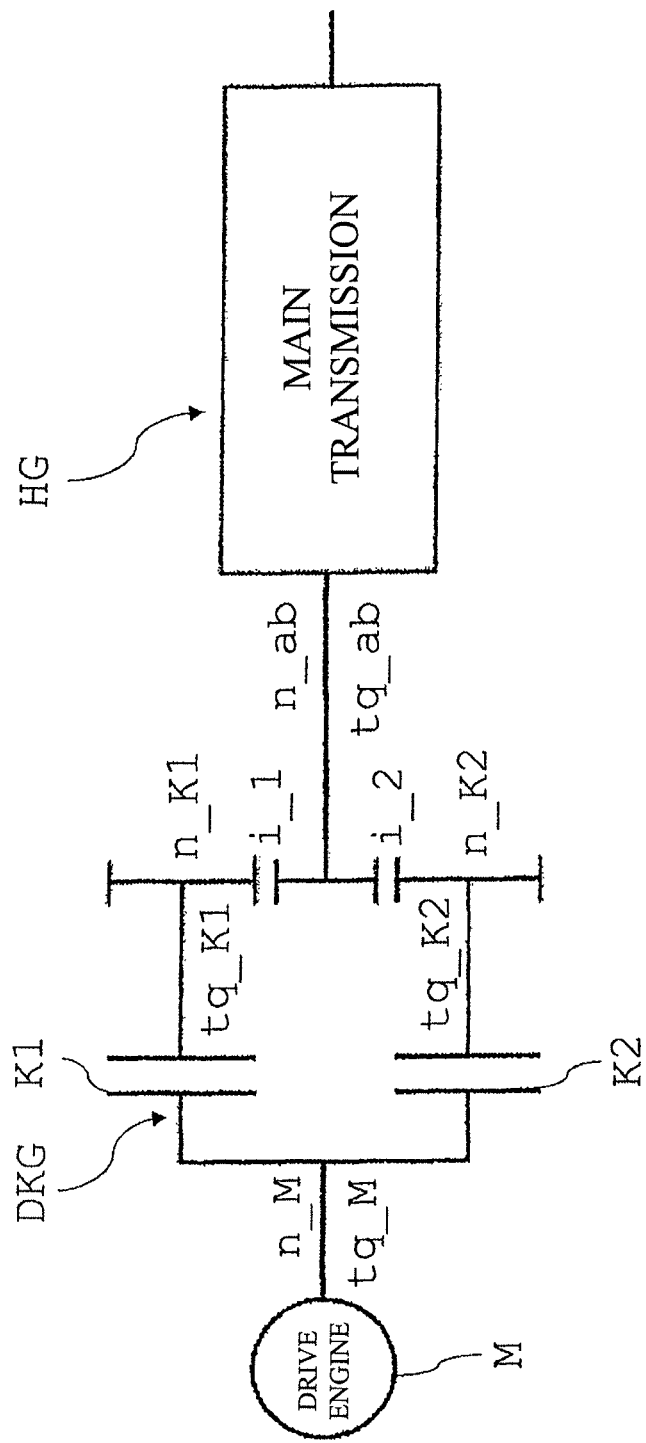
FIG. 2: A diagrammatic equivalent of the dual-clutch transmission.

To make clear the relevant torques and speeds, FIG. 2 shows a diagrammatic equivalent of the transmission structure shown in FIG. 1. According to this, a drive torque tq_M with engine speed n_M can be provided by the drive engine M. A clutch torque tq_K1 can be transmitted by the first clutch K1. In this case the clutch output side rotates at a speed n_K1. A clutch torque tq_K2 can be transmitted by the second clutch K2. In that case the clutch output side rotates at a speed n_K2. At the output of the dual-clutch transmission DKG or input of the main transmission HG there is an output torque tq_ab and a corresponding output speed n_ab.

In a method according to the invention for the characteristic curve adaptation of the dual clutch DK the two clutches K1 and K2 are pre-loaded against one another, so that one clutch K1 or K2 is engaged and the other clutch K1 or K2 is slipping. The characteristic curve of the clutch K1, K2 to be adapted (the slipping one) is then determined or adapted by traversing the clutch adjustment path in the closing direction, if necessary with temporary pauses at relevant clutch positions or torque positions, in a manner known per se, for example by evaluations of speed gradients, fuel injection quantities, torque comparisons, etc.

To simplify and make clear the considerations of torques and speeds, in what follows the clutch K1 is assigned the index "1" for the gear ratio i associated with it, independently of the indexing of the input constants in FIG. 1. Correspondingly, the clutch K2 is assigned the index "2" for the gear ratio i associated with it.

The clutch torques tq_K1 and tq_K2 when the main transmission HG is shifted into neutral at a constant speed n_ab at the drive output AB of the dual-clutch transmission DKG, can be estimated from the conservation equation of the clutch torque and the engine torque tq_M (torque of the drive engine M):

$$tq_{K1} \pm tq_{K2} = tq_M \quad \text{(Equ. 1)}$$

and the torque equilibrium at the output:

$$tq_{K1} \cdot i_1 + tq_{K2} \cdot i_2 = tq_{ab} = 0 \quad \text{(Equ. 2)}$$

This gives the clutch torque of the clutch K2 as:

$$tq_{K2} = -tq_{K1} \cdot \frac{i_1}{i_2} \quad \text{(Equ. 3)}$$

when the clutch K1 is slipping and the clutch K2 is engaged, and for the clutch torque of the clutch K1:

$$tq_{K1} = -tq_{K2} \cdot \frac{i_2}{i_1} \quad \text{(Equ. 4)}$$

when the clutch K2 is slipping and the clutch K1 is engaged.

Whichever clutch K1, K2 is to be permanently engaged during the process must therefore be closed at least far enough for it to be able to transmit a torque in accordance with the above equations Equ. 3 or Equ. 4.

The respective engine torque (load torque at the drive engine) tq_M1 or tq_M2 and a corresponding engine speed n_M required in order to be able to adapt a particular clutch path point or a characteristic curve section in accordance with the method, is given by the equation:

$$tq_{M2} = tq_{K1} \cdot \left(1 - \frac{i_1}{i_2}\right) \quad \text{(Equ. 5)}$$

this equation Equ. 5 giving the load torque at the drive engine when the clutch K1 is slipping and the clutch K2 is engaged, or:

$$tq_{M1} = -|tq_{K2}| \cdot \left(1 - \frac{i_2}{i_1}\right) \quad \text{(Equ. 6)}$$

this equation Equ. 6 giving the load torque at the drive engine when the clutch K2 is slipping and the clutch K1 is engaged.

Basically, it is also possible to extend the equations for non-constant drive output speeds n_ab at the dual-clutch transmission DKG, i.e. for speed gradients d/dt(n_ab), but in that case relevant mass moments of inertia also have to be taken into account.

If one or both dual-clutch transmission branches DKG1, DKG2 have more than one gear, then for the adaptation preferred gears can be engaged, i.e. ones that lead to the quickest possible, low-wear and/or accurate adaptation. In this, however, two aspects must be taken into account:

1. With the help of the engine torque tq_M1 or tq_M2 the characteristic curve cannot directly be completely adapted, since in relation to the drive engine M the clutches K1, K2 always have a transmission reserve, which depends on the gear ratio. However, the adaptable range can be so extended by using the possible gear ratios of the dual-clutch transmission branches that it reaches its maximum extent. A gear ratio related reinforcing factor, which acts to increase the transmission reserve, should therefore be made as small as possible by a suitable choice of gear. When the clutch K1 is being adapted and the clutch K2 is engaged, the factor $(1-i_2/i_1)$ should accordingly be as small as possible, i.e. i_2 should be chosen as large and i_1 as small as possible. When the clutch K2 is being adapted and the clutch K1 is engaged, in contrast the factor $(1-i_1/i_2)$ should be as small as possible, i.e. i_1 should be chosen as large and i_2 as small as possible.

2. Due to the adaptation additional friction energy is generated in the clutch K1, K2 to be adapted, which stresses the clutch in relation to wear and heating. Due to the heating, in unfavorable cases the friction coefficient of the friction linings of the clutch K1, K2 can change during the adaptation. Accordingly, the frictional load during adaptation should be as small as possible. Since the clutch torque tq_K1, tq_K2 is adjusted along the characteristic curve and thus has to be produced, the frictional load can only be kept small by virtue of the speed difference Δn_K12 or n_K21, i.e. the slipping at the clutch K1, K2. The speed difference is determined from the engine speed n_M and the gear ratios i_1, i_2, in accordance with the equation:

$$\Delta n_{K12} = n_M \cdot \left(1 - \frac{i_1}{i_2}\right) \quad \text{(Equ. 7)}$$

when the clutch K1 is slipping and the clutch K2 is engaged, or in accordance with the equation:

$$\Delta n_{K21} = n_M \cdot \left(1 - \frac{i_2}{i_1}\right) \quad \text{(Equ. 8)}$$

when the clutch K2 is slipping and the clutch K1 is engaged.

The speed difference $\Delta n\_K12$ or $\Delta K\_21$ at the clutch concerned can be minimized by selecting the gears such that the gear ratio dependent reinforcing factors are as small as possible. Thus, when the clutch K1 is being adapted and the clutch K2 is engaged, the factor $(1-i_1/i_2)$ should be as small as possible, i.e. i_1 should be chosen as large, and i_2 as small as possible. In contrast, when the clutch K2 is being adapted and the clutch K1 is engaged, the factor $(1-i_2/i_1)$ should be as small as possible, i.e. i_2 should be chosen as large, and i_1 as small as possible.

From this consideration it is evident that the use of the gears of the dual-clutch transmission branches DKG1, DKG2 for maximizing the size of the adaptable characteristic curve range on the one hand, and for minimizing the clutch load on the other hand, has oppositely directed effects. Since it is more appropriate to give priority to extending the torque range, minimizing the friction energy input by a gear selection can only be carried out and is only expedient to the extent permitted by the extending of the torque range. As a result it is advantageous to carry out the characteristic curve adaptation in sections, in such manner that for each section a suitable gear combination is determined and both clutches are adapted in the section concerned, thereafter proceeding analogously for the following sections.

LIST OF INDEXES

AB Drive output shaft
AW Drive input shaft
DK Dual clutch
DKG Dual-clutch transmission
DKG1 Dual-clutch transmission branch
DKG2 Dual-clutch transmission branch
GE1 Transmission input shaft
GE2 Transmission input shaft
HG Main transmission
i_1 Input gear ratio of dual-clutch transmission branch
i_2 Input gear ratio of dual-clutch transmission branch
i_HG1 Main transmission gear
i_HG2 Main transmission gear
K1 Clutch
K2 Clutch
M Drive engine
n_ab Drive output speed at the dual-clutch transmission
n_ab_HG Drive output speed at the main transmission
n_K1 Clutch output speed
n_K2 Clutch output speed
n_M Engine speed
S1 Shifting clutch, claw clutch
tq_K1 Clutch torque at clutch K1
tq_K2 Clutch torque at clutch K2
tq_M Drive engine torque
VW1 Countershaft
z11 Gearwheel
z12 Gearwheel
z21 Gearwheel
z22 Gearwheel
z31 Gearwheel
z32 Gearwheel
z41 Gearwheel
z42 Gearwheel

The invention claimed is:

1. A method of providing a characteristic curve adaptation of clutches in a partial dual-clutch transmission of a vehicle, having a first partial transmission designed as a dual-clutch transmission section (DKG) with a dual clutch (DK) comprising a first clutch (K1) and a second clutch (K2) which can be functionally connected to a drive engine (M),
   the first clutch is engagable so as to drive a common countershaft via a first input constant and the second clutch is engagable so as to drive the common countershaft via a second input constant,
   a second partial transmission is designed as a main transmission (HG),
   the main transmission is connected downstream from the dual-clutch transmission section (DKG) such that traction force, which passes through the first clutch and the second clutch from an output side of the dual-clutch transmission section to an input side of the main transmission, is only transmittable therebetween via the common countershaft, and
   the main transmission shifts with traction force interruption,
   the method comprising the step of:
      shifting the main transmission into neutral to interrupt a flow of the traction force from the drive engine and the dual-clutch transmission section, via the common countershaft, to an output shaft of the main transmission;
      carrying out the characteristic curve adaptation of the first clutch (K1) and the second clutch (K2) with a control unit of the vehicle by pre-loading the first clutch (K1) and the second clutch (K2).

2. The method according to claim 1, further comprising the step of operating one of the first clutch (K1) and the second clutch (K2) in a fully engaged condition while the other of the first clutch (K1) and the second clutch (K2) is actuated in an engaging direction, during the characteristic curve adaptation.

3. The method according to claim 1, further comprising the steps of carrying out the characteristic curve adaptation with the control unit of the vehicle in several steps, and
   storing each intermediate position.

4. The method according to claim 1, further comprising the steps of checking, with assistance of a diagnosis device, a need for the characteristic curve adaptation, and
   carrying out, with the control unit of the vehicle, a complete characteristic curve adaptation during a subsequent, suitable neutral shift of the main transmission (HG).

5. The method according to claim 1, further comprising the steps of:
   preselecting one of the first clutch (K1) and the second clutch (K2) to be provided,
   specifying either a torque variation or a position variation of the dual clutch (DK),
   operating one of the first clutch and the second clutch with slip as a slipping clutch and operating the other one of the first clutch and the second clutch as an engaged clutch in an engaged condition;

calculating with the control unit of the vehicle, during a teach-in process, the clutch torque of the slipping clutch (K1, K2), taking into account an interaction of the first clutch (K1) and the second clutch (K2) due to the preloading, and preselecting, if applicable, a suitable gear combination for the clutch adaptation in the dual-clutch transmission section (DKG).

6. The method according to claim 1, further comprising the step of specifying, for the characteristic curve adaptation, at least one of a speed and an acceleration of an engaging process of one of the first clutch and the second clutch to be adapted by the control unit of the vehicle as a function of at least one of relevant characteristic curve sections, characteristic curve support points, clutch loads, adaptation times and adaptation precision.

7. The method according to claim 6, wherein the characteristic curve adaptation is adapted as a function of the characteristic curve support points and the method further comprising the step of defining the characteristic curve support points as particular clutch positions.

8. The method according to claim 6, wherein the characteristic curve adaptation is adapted as a function of the characteristic curve support points and the method further comprising the step of defining the characteristic curve support points as particular clutch torques.

9. The method according to claim 1, further comprising the step of carrying out an engaging process of one of the first clutch and the second clutch to be adapted during the characteristic curve adaptation one of continuously, in stages, gradually and in accordance with a specified variation.

10. The method according to claim 1, further comprising the step of keeping a predetermined speed of the drive engine (M) constant during the characteristic curve adaptation.

11. The method according to claim 1, further comprising the step of transmitting the traction force from the output side of the dual-clutch transmission section to the input side of the main transmission only via the common countershaft.

12. A method of providing characteristic curve adaptation of clutches in a partial dual-clutch transmission of a utility vehicle that has a drive train including:
a common countershaft,
a dual-clutch transmission section, and
a main transmission, the dual-clutch transmission comprises a first clutch and a second clutch,
a drive engine is connected to a drive input side of the first clutch and a drive input side of the second clutch,
a drive output side of each of the first clutch and the second clutch is connected to the common countershaft that is arranged downstream from the dual-clutch transmission section and the common countershaft is connected to the main transmission,
such that traction force, which passes along the drive-train through the first clutch and the second clutch and from an output side of the dual-clutch transmission section to an input side of the main transmission, is only transmittable therebetween via the common countershaft, and
the main transmission shifts with traction force interruption, the method comprising the steps of:
shifting the main transmission into a neutral position to interrupt flow of the traction force from the first clutch and the second clutch to an output shaft of the main transmission;
providing the characteristic curve adaptation of one of the first clutch and the second clutch, with a control unit of the vehicle when the main transmission (HG) is in the neutral position, by engaging one of the first clutch and the second clutch to a non-slipping condition and actuating the other of the first clutch and the second clutch in an engaging direction;
operating the first clutch in the non-slipping condition to transmit torque from the drive engine to the common countershaft and actuating the second clutch in the engaging direction so as to increase an amount of torque transmitted therethrough, during adaptation of the characteristic curve of the second clutch;
calculating, with the control unit of the vehicle, changes in torque of the second clutch transmitted from the drive engine to the common countershaft while the second clutch is actuated in the engaging direction; and
transmitting the traction force from the output side of the dual-clutch transmission section to the input side of the main transmission only via the common countershaft.

* * * * *